United States Patent
Yuan et al.

(10) Patent No.: US 9,266,197 B2
(45) Date of Patent: Feb. 23, 2016

(54) TANDEM GAS-SHIELDED ARC WELDING METHOD

(71) Applicant: Kobe Steel, Ltd., Kobe (JP)

(72) Inventors: Yimin Yuan, Fujisawa (JP); Kei Yamazaki, Fujisawa (JP); Reiichi Suzuki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 377 days.

(21) Appl. No.: 13/765,818

(22) Filed: Feb. 13, 2013

(65) Prior Publication Data

US 2013/0233833 A1    Sep. 12, 2013

(30) Foreign Application Priority Data

Mar. 9, 2012   (JP) .................... 2012-053590

(51) Int. Cl.
| | |
|---|---|
| *B23K 35/38* | (2006.01) |
| *B23K 9/02* | (2006.01) |
| *B23K 9/073* | (2006.01) |
| *B23K 9/173* | (2006.01) |
| *B23K 9/16* | (2006.01) |

(52) U.S. Cl.
CPC . *B23K 35/38* (2013.01); *B23K 9/02* (2013.01); *B23K 9/16* (2013.01); *B23K 9/1735* (2013.01)

(58) Field of Classification Search
CPC ............ B23K 35/38; B23K 9/16; B23K 9/02; B23K 9/1735; B23K 9/0731; B23K 9/0732; B23K 9/0734; B23K 9/095; B23K 9/0953
See application file for complete search history.

(56) References Cited

U.S. PATENT DOCUMENTS

| | | |
|---|---|---|
| 3,007,033 A | 10/1961 | Newman et al. |
| 4,013,868 A | 3/1977 | Koshiga et al. |

(Continued)

FOREIGN PATENT DOCUMENTS

| | | |
|---|---|---|
| EP | 1 707 296 A1 | 10/2006 |
| GB | 1 517 097 A | 7/1978 |

(Continued)

OTHER PUBLICATIONS

Extended European Search Report issued Jun. 28, 2013 in Patent Application No. 13000475.7.

*Primary Examiner* — Geoffrey S Evans
(74) *Attorney, Agent, or Firm* — Oblon, McClelland, Maier & Neustadt, L.L.P.

(57) ABSTRACT

In a tandem gas-shielded arc welding method, carbon dioxide is used as a shielding gas for a leading electrode formed by a solid wire, an argon-carbon dioxide gas mixture containing at least 60% by volume of argon gas is used as a shielding gas for a trailing electrode formed by a solid wire or a flux-cored wire, both the leading electrode and the trailing electrode have a reverse polarity, the leading electrode satisfies the relationships "$5.00 \leq (I \cdot V \cdot 10^{-8})/(W_f \cdot \pi r^2) \leq 10.00$" and "$(I^2 \cdot 10^{-3})/V \geq 4.50$", and the trailing electrode satisfies the relationships "$4.00 \leq (I \cdot V \cdot 10^{-8})/(W_f \cdot \pi r^2) \leq 7.00$" and "$(I^2 \cdot 10^{-3})/V \geq 8.00$".

4 Claims, 5 Drawing Sheets

(56) References Cited

U.S. PATENT DOCUMENTS

| | | | |
|---|---|---|---|
| 4,246,463 A * | 1/1981 | Shutt | B23K 9/188 219/137 R |
| 4,902,873 A * | 2/1990 | Ivannikov | B23K 35/0283 219/137 R |
| 2004/0050833 A1* | 3/2004 | Stava et al. | 219/130.51 |
| 2004/0140302 A1* | 7/2004 | Myers et al. | 219/130.51 |
| 2004/0140303 A1 | 7/2004 | Kataoka et al. | |
| 2006/0243704 A1 | 11/2006 | Matz et al. | |
| 2009/0236320 A1 | 9/2009 | Enatsu et al. | |
| 2009/0308855 A1* | 12/2009 | Yoshima | 219/125.1 |
| 2010/0230394 A1* | 9/2010 | Yokota et al. | 219/130.51 |
| 2010/0301030 A1* | 12/2010 | Zhang et al. | 219/130.1 |
| 2011/0309062 A1* | 12/2011 | O'Donnell et al. | 219/130.1 |

FOREIGN PATENT DOCUMENTS

| | | |
|---|---|---|
| JP | 3-110070 | 5/1991 |
| JP | 9-206945 | 8/1997 |
| JP | 2003-53545 | 2/2003 |
| JP | 2004-188428 A | 7/2004 |
| JP | 2008-55509 | 3/2008 |
| JP | 2010-125496 A | 6/2010 |
| WO | WO 2008/016084 A1 | 2/2008 |

* cited by examiner

FIG. 1A
RELATED METHOD

FIG. 1B
INVENTIVE METHOD

FIG. 2A
100% CARBON DIOXIDE

FIG. 2B
ARGON GAS OR
ARGON-BASED GAS MIXTURE

FIG. 3A
RELATED METHOD

FIG. 3B
INVENTIVE METHOD

FIG. 4

FIG. 5A
RELATED METHOD

FIG. 5B
INVENTIVE METHOD

TANDEM GAS-SHIELDED ARC WELDING METHOD

BACKGROUND OF THE INVENTION

1. Field of the Invention

The present invention relates to a two-electrode welding method in gas-shielded arc welding.

2. Description of the Related Art

Techniques for a gas-shielded arc welding method have been proposed in International Publication No. WO2008/016084, Japanese Unexamined Patent Application Publication No. 2004-188428, and Japanese Unexamined Patent Application Publication No. 2010-125496. For example, International Publication No. WO2008/016084 makes an assumption, in tandem gas metal arc (GMA) welding, that there is a different shielding gas composition suitable for each of a leading electrode and a trailing electrode. This is because the leading electrode has a function of increasing the depth of weld penetration into a base material, whereas the trailing electrode has a function of stopping the flow of metal with arc pressure to shape a molten pool, the metal being melted by an arc from the leading electrode and flowing backward from the molten pool. Under the assumption described above, International Publication No. WO2008/016084 proposes a technique in which, by supplying shielding gases of different compositions suitable for the leading electrode and the trailing electrode, it is possible to stabilize the droplet transfer and reduce the amount of spatter without sacrificing the depth of weld penetration.

Specifically, International Publication No. WO2008/016084 proposes a technique in which a leading-electrode shielding gas to be supplied to the leading electrode is a two-component gas mixture of argon gas and carbon dioxide or a three-component gas mixture of argon gas, carbon dioxide, and oxygen gas; a trailing-electrode shielding gas to be supplied to the trailing electrode is argon gas alone, a two-component gas mixture of argon gas and carbon dioxide, a two-component gas mixture of argon gas and oxygen gas, or a three-component gas mixture of argon gas, carbon dioxide, and oxygen gas; and the concentration of carbon dioxide in the trailing-electrode shielding gas is lower than that in the leading-electrode shielding gas.

Japanese Unexamined Patent Application Publication No. 2004-188428 proposes a welding wire and a welding method using the welding wire to solve the problem with related art in which, in welding using a shielding gas containing at least 50% by volume of carbon dioxide, it is very difficult to achieve spray transfer. That is, Japanese Unexamined Patent Application Publication No. 2004-188428 proposes a welding wire and a welding method using the welding wire with which, in carbon dioxide gas-shielded arc welding using a shielding gas mainly composed of carbon dioxide, droplet spray transfer can be achieved and it is possible not only to reduce the amount of spatter but also to obtain a good bead shape even when high-speed welding is performed. Note that the shielding gas mainly composed of carbon dioxide refers to a shielding gas that contains, for example, at least 50% by volume of carbon dioxide.

Specifically, Japanese Unexamined Patent Application Publication No. 2004-188428 proposes a technique in which a rare-earth element is added to a welding wire and the content of calcium (Ca) is specified to stabilize and concentrate an arcing point in a negative electrode; a straight polarity, which is opposite the normal polarity, is used (i.e., the welding wire is negatively charged) to reduce the amount of spatter even when a larger amount of carbon dioxide is contained in the shielding gas; and titanium (Ti), zirconium (Zr), and aluminum (Al), which are strong deoxidizing elements, are added to the welding wire to achieve more stabilized weldability.

Japanese Unexamined Patent Application Publication No. 2010-125496 proposes a technique in which, in a tandem gas-shielded arc welding method of consumable electrode type which uses two welding wires as electrodes, an active gas containing at least 40% by volume of carbon dioxide ($CO_2$) is used as a shielding gas for the leading electrode, an inert gas containing a total of at least 99.5% by volume of one or two of argon (Ar) gas, helium (He) gas, and hydrogen ($H_2$) gas is used as a shielding gas for the trailing electrode, and slag is removed by the trailing electrode before molten metal produced in the leading electrode is solidified.

In the technique proposed in International Publication No. WO2008/016084, a gas mixture mainly composed of inert gas, such as argon gas, is used as a shielding gas to reduce the amount of spatter. However, this technique has a problem in that the weld penetration is as shallow as that in a tandem method of related art. Also, the technique proposed in International Publication No. WO2008/016084 has a problem in that the cost of the shielding gas is high. Since the cost of inert gas, such as argon gas, is several times higher than that of carbon dioxide, it has been desired, in actual welding practice, to reduce the use of inert gas and to use a gas mainly composed of carbon dioxide as much as possible.

The technique proposed in Japanese Unexamined Patent Application Publication No. 2004-188428 has a problem in that the rare earth element added to the welding wire is expensive. Also, although the technique proposed in Japanese Unexamined Patent Application Publication No. 2004-188428 is limited to a straight polarity, a large amount of spatter is produced if, for example, welding is performed with a straight polarity by using an inexpensive solid wire.

As with the technique proposed in Japanese Unexamined Patent Application Publication No. 2004-188428, the technique proposed in Japanese Unexamined Patent Application Publication No. 2010-125496 has a problem in that the rare earth element added to the welding wire is expensive. Additionally, the technique proposed in Japanese Unexamined Patent Application Publication No. 2010-125496 has a problem in that it is not possible to perform tandem gas-shielded arc welding if an active gas containing 100% by volume of $CO_2$ is used as a shielding gas for the leading electrode and, at the same time, an inexpensive solid wire is used as the leading electrode. As a preferred embodiment of this technique, Japanese Unexamined Patent Application Publication No. 2010-125496 proposes a technique in which the leading electrode and the trailing electrode are made to have a straight polarity and a reverse polarity, respectively. This causes two arcs to repel each other and affects the process in which a weld bead is shaped by the trailing electrode, which is the greatest benefit of tandem gas-shielded arc welding.

Generally, welding which uses carbon dioxide as a shielding gas for the leading electrode has been known for providing deep weld penetration. However, due to a very large amount of spatter, it has been unable to use carbon dioxide in tandem gas-shielded arc welding.

The present invention has been made in view of the problems described above. An object of the present invention is to provide a tandem gas-shielded arc welding method in which, even though 100% carbon dioxide is used for the leading electrode, it is possible to achieve lower cost, less spatter, and deeper weld penetration than those in tandem gas-shielded arc welding of related art which uses a shielding gas mainly composed of inert gas.

SUMMARY OF THE INVENTION

A tandem gas-shielded arc welding method according to an aspect of the present invention, which has been made to solve the problems described above, is a tandem gas-shielded arc welding method using a leading electrode and a trailing electrode, the method including using a solid wire as the leading electrode and using carbon dioxide as a shielding gas for the leading electrode; using a solid wire or a flux-cored wire as the trailing electrode and using an argon-carbon dioxide gas mixture containing at least 60% by volume of argon gas as a shielding gas for the trailing electrode; making both the leading electrode and the trailing electrode have a reverse polarity; adjusting a welding current I (A), a welding voltage V (V), a wire feed speed $W_f$ (m/minute), and a wire radius r (m) in welding conditions for the leading electrode to satisfy relationships represented by Expression (1) and Expression (2) described below; and adjusting a welding current I (A) and a welding voltage V (V) in welding conditions for the trailing electrode to satisfy relationships represented by Expression (3) and Expression (4) described below.

$$5.00 \leq \frac{I \cdot V \cdot 10^{-8}}{W_f \cdot \pi r^2} \leq 10.00 \qquad \text{Expression (1)}$$

$$\frac{I^2 \cdot 10^{-3}}{V} \geq 4.50 \qquad \text{Expression (2)}$$

$$4.00 \leq \frac{I \cdot V \cdot 10^{-8}}{W_f \cdot \pi r^2} \leq 7.00 \qquad \text{Expression (3)}$$

$$\frac{I^2 \cdot 10^{-3}}{V} \leq 8.00 \qquad \text{Expression (4)}$$

Thus, in the tandem gas-shielded arc welding method described above, by adjusting the welding conditions for the leading electrode to satisfy Expression (1) and Expression (2), even when carbon dioxide is used as a shielding gas for the leading electrode, it is possible to maintain stable spray transfer and significantly reduce the amount of spatter while providing deep weld penetration. Also, by adjusting the welding conditions for the trailing electrode to satisfy Expression (3) and Expression (4), it is possible to form a flat bead and reduce the amount of spatter caused by arc interference. Thus, by applying the welding conditions satisfying Expressions (1), (2), (3), and (4) to the leading electrode and the trailing electrode, a tandem gas-shielded arc welding method that achieves low cost, deep weld penetration, and less spatter is provided.

In the tandem gas-shielded arc welding method described above, it is preferable that a wire diameter a (mm) of the leading electrode satisfy a≤2.0, and a wire diameter b (mm) of the trailing electrode satisfy b≤(a−0.2).

Thus, with the tandem gas-shielded arc welding method described above, it is possible to increase the welding current by using a wire having a predetermined diameter or more as the leading electrode, and also possible to increase the wire melting rate by using a wire having a diameter smaller than that of the leading electrode as the trailing electrode.

In the tandem gas-shielded arc welding method described above, by adjusting the welding conditions for both the leading electrode and the trailing electrode, even though 100% carbon dioxide is used as a shielding gas for the leading electrode, it is possible to achieve less spatter and increase the depth of weld penetration. Also, in the tandem gas-shielded arc welding method described above, by using an inexpensive solid wire as the leading electrode and inexpensive carbon dioxide as a shielding gas for the leading electrode, it is possible to achieve a significant cost reduction and a high-quality and efficient welding process that can increase the welding speed and the wire melting rate.

BRIEF DESCRIPTION OF THE DRAWINGS

FIG. 2A and FIG. 2B are schematic diagrams illustrating droplets and arcs for different shielding gases in tandem gas-shielded arc welding.

DESCRIPTION OF THE PREFERRED EMBODIMENTS

A tandem gas-shielded arc welding method according to an embodiment of the present invention will now be described in detail with reference to the drawings. Note that for purposes of illustration, sizes and shapes of some components may be exaggerated in the drawings, and some parts may be omitted from the drawings. In the following description, tandem gas-shielded arc welding may be simply referred to as "tandem welding". Also in the following description, a tandem gas-shielded arc welding method of related art may be simply referred to as "related method", and a tandem gas-shielded arc welding method according to the present invention may be simply referred to as "inventive method".

Figure 1A:
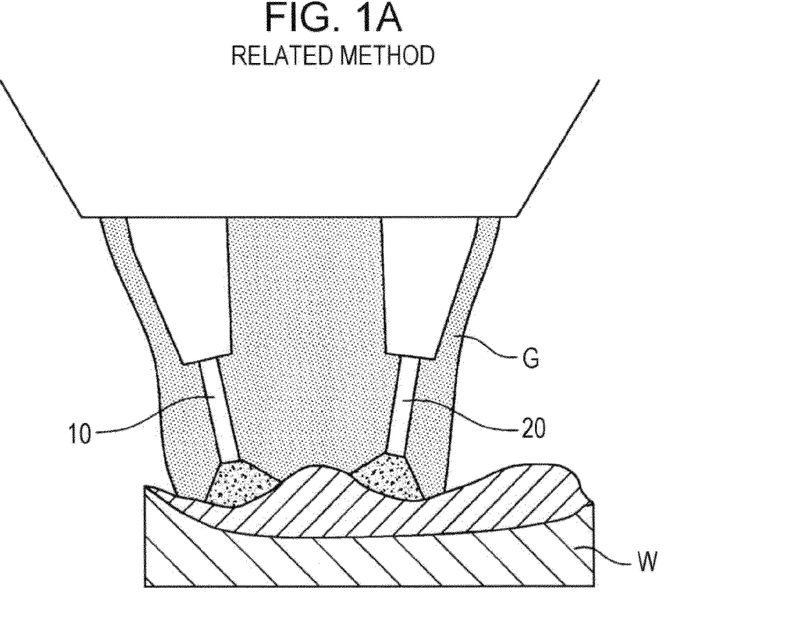
FIG. 1A is a schematic diagram for explaining tandem gas-shielded arc welding of related art.
Figure 1B:
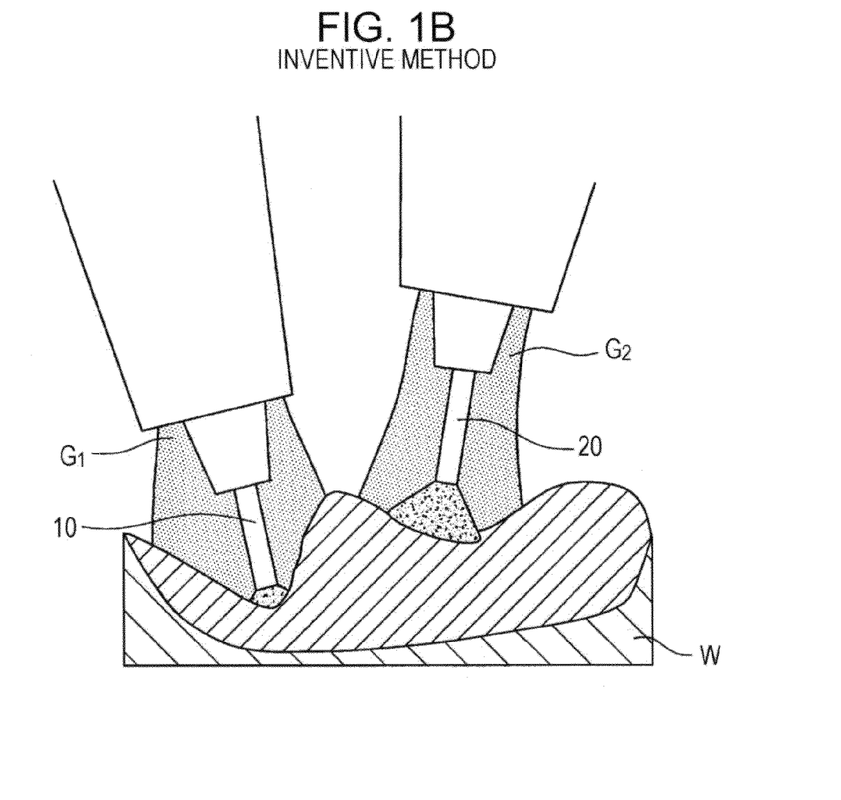
FIG. 1B is a schematic diagram for explaining tandem gas-shielded arc welding according to the present invention.

A tandem gas-shielded arc welding method is a process that involves welding with two electrodes, a leading electrode and a trailing electrode, while injecting a shielding gas to a weld area. In some types of tandem welding of related art, for example, as illustrated in FIG. 1A, welding may be performed using the same type of wire and the same type of shielding gas G for both a leading electrode 10 and a trailing electrode 20. In the present invention, however, as illustrated in FIG. 1B, welding is performed using different wires and different shielding gases $G_1$ and $G_2$ for the leading electrode 10 and the trailing electrode 20.

In tandem welding, to achieve less spatter and a good bead shape, it is very important to maintain a stable droplet transfer mode in both the leading electrode 10 and the trailing electrode 20. In tandem welding, the leading electrode 10 has a larger impact on weld penetration than the trailing electrode 20 does. Therefore, in the present invention, 100% carbon dioxide that provides deep weld penetration is used as the shielding gas $G_1$ for the leading electrode 10. No method has been developed so far which can maintain stable spray transfer even in reverse polarity welding performed using an inexpensive wire.

Figure 2A:
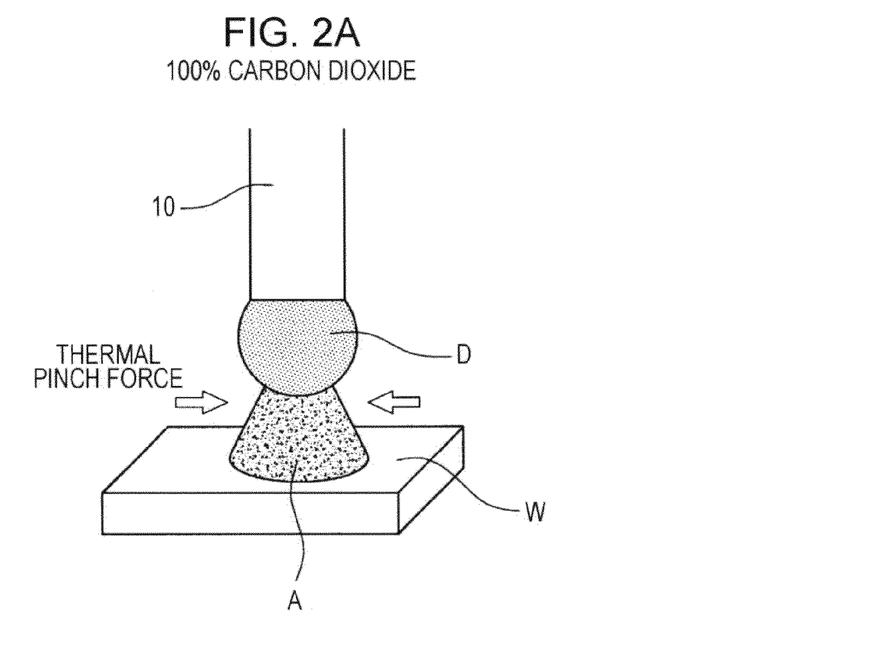
FIG. 2A illustrates a droplet and an arc produced when carbon dioxide is used as a shielding gas.
Figure 3A:
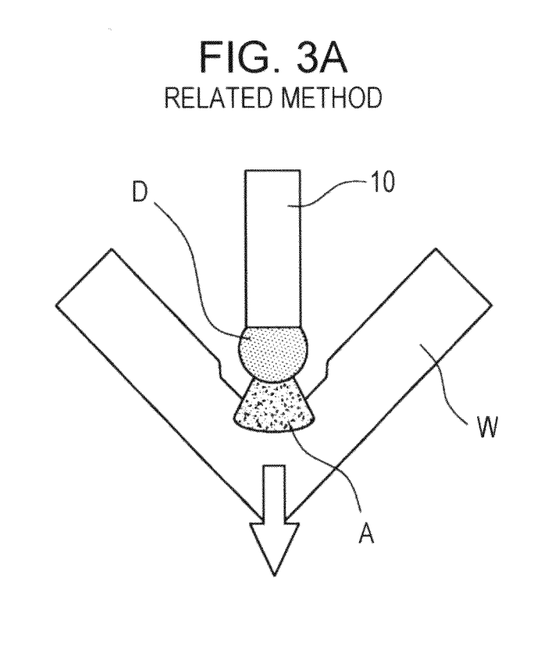
FIG. 3A is a schematic diagram illustrating a droplet, an arc, and weld penetration in tandem gas-shielded arc welding of related art.

As illustrated in FIG. 2A and FIG. 3A, in typical 100% carbon dioxide welding, unlike in the case of using an argon gas or a gas mixture mainly composed of argon gas, an arc A is produced under a droplet D, not around the droplet D. As a result, as illustrated in FIG. 2A, since the droplet D cannot be easily detached and grows in size, a mode of transfer called globular transfer is entered. In globular transfer, the droplet D pushed up by the arc force increased by tension flies around, which results in a large amount of spatter being produced. Since this is further encouraged in tandem welding and an extremely large amount of spatter is produced, 100% carbon dioxide has not been used at all in the practice of tandem welding. Note that globular transfer is a mode of transfer in which, as illustrated in FIG. 2A, the droplet D is transferred in a size greater than the wire diameter of the leading electrode 10.

Figure 2B:
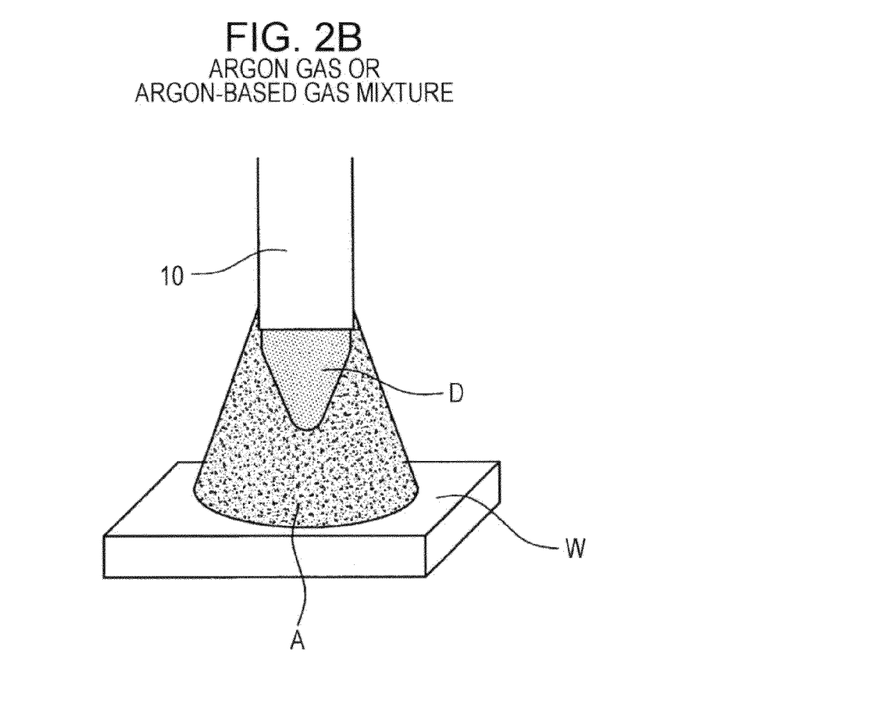
FIG. 2B illustrates a droplet and an arc produced when a gas mixture mainly composed of inert gas is used as a shielding gas.

In contrast, as illustrated in FIG. 2B, in tandem welding using an argon gas or a gas mixture mainly composed of argon gas (argon-based gas mixture), the arc A is produced around the droplet D. Thus, since an electromagnetic pinch force of the arc A facilitates detachment of the droplet D, it is possible to maintain stable spray transfer. However, this welding has a problem in that weld penetration is shallow. Note that spray transfer is a mode of transfer in which, as illustrated in FIG. 2B, the droplet D is transferred in a size smaller than or equal to the wire diameter of the leading electrode 10.

Figure 3B:
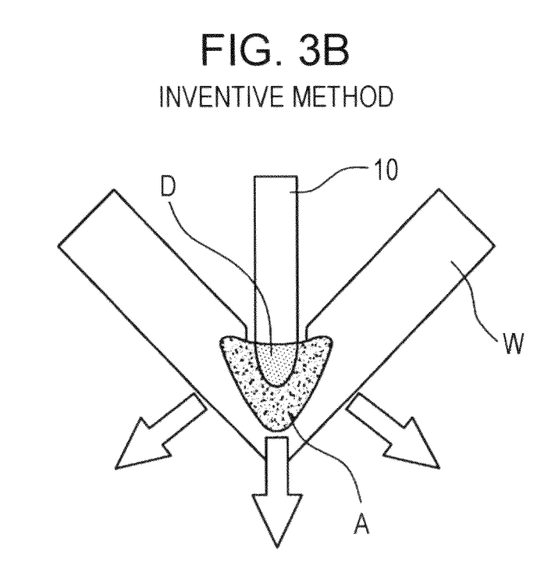
FIG. 3B is a schematic diagram illustrating a droplet, an arc, and weld penetration in tandem gas-shielded arc welding according to the present invention.

After careful studies, the present inventors have found the following. As illustrated in FIG. 3B, the arc A is produced in such a manner as to dig into a base material W by using 100% carbon dioxide as the shielding gas $G_1$ for the leading electrode 10. Then, when the arc A is formed between the droplet D and a groove wall surface to wrap around the droplet D, the electromagnetic pinch force of the arc A facilitates detachment of the droplet D. Thus, even in reverse polarity welding, it is possible to achieve spray transfer and, by limiting the ratio of voltage to current, it is also possible to achieve deep weld penetration. The present inventors have also found basic requirements in welding conditions, and have devised a tandem gas-shielded arc welding method that satisfies requirements, such as low cost, less spatter, and deep weld penetration. The devised method will now be described in detail.

(Leading Electrode)

In a tandem gas-shielded arc welding method according to an embodiment of the present invention, an inexpensive solid wire is used as the leading electrode 10 and inexpensive 100% carbon dioxide is used as the shielding gas $G_1$ for the leading electrode 10 to perform reverse polarity welding. In the tandem gas-shielded arc welding method according to the embodiment of the present invention, a welding current I (A), a welding voltage V (V), a wire feed speed $W_f$ (m/minute), and a wire radius r (m) in welding conditions for the leading electrode 10 are determined to satisfy the relationship represented by Expression (1) below.

$$5.00 \leq \frac{I \cdot V \cdot 10^{-8}}{W_f \cdot \pi r^2} \leq 10.00 \quad \text{Expression (1)}$$

$$\frac{I^2 \cdot 10^{-3}}{V} \geq 4.50 \quad \text{Expression (2)}$$

In Expression (1), "I·V" represents the amount of energy necessary to melt the wire or the leading electrode 10, and "$W_f \cdot \pi r^2$" represents the volume of the wire or the leading electrode 10 fed per minute. Expression (1) defines the relationship between the necessary amount of energy and the volume, and Expression (2) defines the relationship between current and voltage having an impact on the amount of energy. By satisfying Expression (1) and Expression (2) described above, it is possible, as illustrated in FIG. 3B, to achieve spray transfer even in 100% carbon dioxide welding, and to achieve tandem welding that provides less spatter and deep weld penetration.

Expression (1) defines upper and lower limits. Specifically, if the value of "$(I \cdot V \pi 10^{-8})/(W_f \cdot \pi r^2)$" exceeds 10.00, it is not possible to achieve spray transfer in 100% carbon dioxide welding, and not possible to achieve less spatter welding. For example, if the welding current I (A) is too high, the arc force is also high. The excessive arc force degrades the stability of a pool and causes instability of a basin between the two electrodes. This leads to a large amount of spatter and a degraded bead shape. If the welding voltage V (V) is too high, spray transfer cannot be maintained and globular transfer causes a large amount of spatter.

Also, as indicated by Expression (1), if the value of "$(I \cdot V \cdot 10^{-8})/(W_f \cdot \pi r^2)$" is below 5.00, it is not possible to ensure deep weld penetration even in 100% carbon dioxide welding, and not possible to achieve less spatter welding. For example, if the welding current I (A) is too low, the arc force is small and the weld penetration is shallow. Also, due to lack of electromagnetic pinch force acting on the droplet D, spray transfer cannot be maintained and a large amount of spatter is produced. Moreover, if the welding voltage V (V) is too low, the amount of energy is insufficient to melt the wire and the base material W. This leads to a short circuit, shallow weld penetration, and a large amount of spatter.

In the tandem gas-shielded arc welding method according to the embodiment of the present invention, as illustrated in FIG. 1B, the arc length of the leading electrode 10 needs to be kept short to ensure deep weld penetration. Therefore, in the tandem gas-shielded arc welding method according to the embodiment of the present invention, the welding current I (A) and the welding voltage V (V) in welding conditions for the leading electrode 10 are determined to satisfy not only the relationship represented by Expression (1) but also the relationship represented by Expression (2).

Specifically, if the welding current I (A) is insufficient and the value of Expression (2) is below 4.50, the weld penetration is shallow and spray transfer cannot be maintained. If the welding voltage V (V) is too high and the value of Expression (2) is below 4.50, spray transfer cannot be maintained and globular transfer causes a large amount of spatter.

(Trailing Electrode)

In the tandem gas-shielded arc welding method according to the embodiment of the present invention, an inexpensive solid wire or a flux-cored wire is used as the trailing electrode 20 and a gas mixture of argon and carbon dioxide, containing at least 60% by volume of argon gas, is used as the shielding gas $G_2$ for the trailing electrode 20 to perform reverse polarity welding.

By satisfying Expression (1) and Expression (2) that define the welding conditions for the leading electrode 10, it is possible to significantly reduce the amount of spatter from the leading electrode 10 while providing deep weld penetration. However, even when the welding conditions for the leading electrode 10 alone are appropriately defined in the tandem gas-shielded arc welding method, a good bead may not be obtained and a large amount of spatter may be produced from the trailing electrode 20 if the welding conditions for the trailing electrode 20 are not appropriate. Therefore, in the tandem gas-shielded arc welding method according to the embodiment of the present invention, in addition to adjusting the welding conditions for the leading electrode 10, a welding current I (A), a welding voltage V (V), a wire feed speed $W_f$ (m/minute), and a wire radius r (m) in the welding conditions for the trailing electrode 20 are adjusted to satisfy the relationships represented by Expression (3) and Expression (4) described below. By adjusting the welding conditions for the trailing electrode 20 to satisfy Expression (3) and Expression (4), it is possible to maintain a proper arc length of the trailing electrode 20, properly shape a bead, and achieve less spatter.

$$4.00 \le \frac{I \cdot V \cdot 10^{-8}}{W_f \cdot \pi r^2} \le 7.00 \qquad \text{Expression (3)}$$

$$\frac{I^2 \cdot 10^{-3}}{V} \le 8.00 \qquad \text{Expression (4)}$$

As indicated by Expression (3), if the value of "$(I \cdot V \cdot 10^8)/(W_f \cdot \pi r^2)$" exceeds 7.00, less spatter and a proper bead shape cannot be achieved. That is, if the welding current I (A) is too high, since the arc force of the trailing electrode 20 is too high, a basin formed between the two electrodes is unstable and a proper bead shape cannot be obtained. If the welding voltage V (V) is too high, a large amount of spatter is produced because the arc length is too long. Also, if the value of "$(I \cdot V \cdot 10^8)/(W_f \cdot \pi r^2)$" is below 4.00, less spatter and a proper bead shape cannot be achieved. That is, if the welding current I (A) is too low, since the electromagnetic pinch force is too small to avoid globular transfer, the amount of spatter produced from the trailing electrode 20 increases. Additionally, since the arc force of the trailing electrode 20 is too low to expand a molten pool formed by the leading electrode 10, a proper bead shape cannot be obtained. Also, if the welding voltage V (V) is too low, a short circuit occurs because the arc length is too short. Also, a large amount of spatter is produced and a bead cannot be shaped properly.

As indicated by Expression (4), the upper limit of "$(I^2 \cdot 10^{-3})/V$" is set to 8.00. This is because if the value of "$(I^2 \cdot 10^{-3})/V$" exceeds 8.00, the welding voltage is too low to properly shape a raised bead formed by the leading electrode 10.

In the tandem gas-shielded arc welding method according to the embodiment of the present invention, by adjusting the welding conditions for the leading electrode 10 to satisfy Expression (1) and Expression (2), even in reverse polarity welding that uses carbon dioxide as the shielding gas $G_1$ for the leading electrode 10, it is possible to maintain stable spray transfer and significantly reduce the amount of spatter while providing deep weld penetration. Also, in the tandem gas-shielded arc welding method according to the embodiment of the present invention, by adjusting the welding conditions for the trailing electrode 20 to satisfy Expression (3) and Expression (4), it is possible to achieve a good bead shape and reduce the amount of spatter.

In the tandem gas-shielded arc welding method according to the embodiment of the present invention, by adjusting the welding conditions for the leading electrode 10 and the trailing electrode 20, even though 100% carbon dioxide is used for the leading electrode 10, it is possible to reduce the amount of spatter and increase the depth of weld penetration. Also, in the tandem gas-shielded arc welding method according to the embodiment of the present invention, by using an inexpensive solid wire as the leading electrode 10 and using inexpensive carbon dioxide as the shielding gas $G_1$ for the leading electrode 10, it is possible to achieve a significant cost reduction and a high-quality and efficient welding process.

In the tandem gas-shielded arc welding method according to the embodiment of the present invention, it is preferable that a wire diameter a (mm) of the leading electrode 10 satisfy a≤2.0 and a wire diameter b (mm) of the trailing electrode 20 satisfy b≤(a−0.2). Thus, in the tandem gas-shielded arc welding method according to the embodiment of the present invention, it is possible to increase the welding current I (A) by using a wire having a predetermined diameter or more as the leading electrode 10, and also possible to increase the wire melting rate by using a wire having a diameter smaller than that of the leading electrode 10 as the trailing electrode 20.

EXAMPLES

The tandem gas-shielded arc welding method according to the embodiment of the present invention will now be described by comparing examples that satisfy the requirements of the present invention with comparative examples that do not satisfy the requirements of the present invention.

As a first experiment, tandem welding was performed under various sets of welding conditions for the leading electrode 10 and the trailing electrode 20 to evaluate the amount of spatter for each set of welding conditions. In the present experiment, a solid wire was used as the leading electrode 10 and a flux-cored wire was used as the trailing electrode 20. Carbon dioxide was used as the shielding gas $G_1$ for the leading electrode 10, and a gas mixture of Ar and 10% to 30% $CO_2$, that is, an argon-carbon dioxide gas mixture containing at least 60% by volume of argon gas, was used as the shielding gas $G_2$ for the trailing electrode 20. Flat fillet welding was performed, in which the distance between the leading electrode 10 and the trailing electrode 20 was 30 mm and the welding speed was 80 cm/minute. In the present experiment, the polarity of the leading electrode 10 and the trailing electrode 20 was reverse polarity. Table 1 and Table 2 show the results of the tandem welding performed under the conditions described above.

TABLE 1

| | Leading Electrode | | | | | | | | Trailing Electrode | | | | | | | Evaluation | | | |
|---|---|---|---|---|---|---|---|---|---|---|---|---|---|---|---|---|---|---|---|
| No. | Polarity | Wire Feed Speed [m/minute] | Wire Diameter [mm] | Welding Current [A] | Welding Voltage [V] | Expression (1) Calculated Value | Expression (2) Calculated Value | Polarity | Wire Feed Speed [m/minute] | Wire Diameter [mm] | Welding Current [A] | Welding Voltage [V] | Expression (3) Calculated Value | Expression (4) Calculated Value | Spatter Evaluation | Bead Shape | Overall Evaluation | Remarks |
| 1 | Reverse | 8.0 | 2.0 | 650 | 39.0 | 10.09 | 10.83 | Reverse | 18 | 1.6 | 543 | 29.1 | 4.37 | 10.13 | Bad | Bad | Bad | Comparative Example |
| 2 | Reverse | 6.1 | 2.0 | 499 | 27.7 | 7.22 | 8.99 | Reverse | 16 | 1.6 | 503 | 38.5 | 6.02 | 6.57 | Good | Good | Good | Example |
| 3 | Reverse | 5.1 | 2.0 | 442 | 23.8 | 6.57 | 8.21 | Reverse | 13 | 1.6 | 420 | 33.0 | 5.31 | 5.35 | Good | Good | Good | |
| 4 | Reverse | 4.0 | 2.0 | 380 | 16.0 | 4.84 | 9.03 | Reverse | 13 | 1.6 | 440 | 18.0 | 3.03 | 10.76 | Bad | Bad | Bad | Comparative Example |
| 5 | Reverse | 17.0 | 1.6 | 630 | 26.5 | 4.89 | 14.98 | Reverse | 26 | 1.4 | 520 | 39.0 | 5.07 | 6.93 | Bad | Good | Bad | |
| 6 | Reverse | 16.0 | 1.6 | 600 | 32.0 | 5.97 | 11.25 | Reverse | 26 | 1.4 | 532 | 42.6 | 5.67 | 6.64 | Good | Good | Good | Example |
| 7 | Reverse | 14.0 | 1.6 | 550 | 31.0 | 6.06 | 9.76 | Reverse | 26 | 1.4 | 527 | 40.1 | 5.28 | 6.93 | Good | Good | Good | |
| 8 | Reverse | 10.0 | 1.6 | 456 | 28.4 | 6.44 | 7.32 | Reverse | 18 | 1.4 | 410 | 32.0 | 4.74 | 5.25 | Good | Good | Good | |
| 9 | Reverse | 8.0 | 1.6 | 406 | 26.5 | 6.69 | 6.22 | Reverse | 16 | 1.4 | 340 | 36.2 | 6.81 | 3.19 | Good | Good | Good | |
| 10 | Reverse | 6.0 | 1.6 | 351 | 24.3 | 7.07 | 5.07 | Reverse | 14 | 1.4 | 413 | 35.7 | 6.84 | 4.78 | Good | Good | Good | |
| 11 | Reverse | 6.0 | 1.6 | 371 | 29.6 | 9.11 | 4.65 | Reverse | 17 | 1.2 | 352 | 38.0 | 6.96 | 3.26 | Good | Good | Good | |
| 12 | Reverse | 4.0 | 1.6 | 331 | 27.0 | 11.12 | 4.06 | Reverse | 16 | 1.2 | 330 | 34.3 | 6.26 | 3.17 | Bad | Good | Bad | Comparative Example |
| 13 | Reverse | 20.0 | 1.4 | 630 | 49.0 | 10.03 | 8.10 | Reverse | 20 | 1.2 | 400 | 36.0 | 6.37 | 4.44 | Bad | Good | Bad | |
| 14 | Reverse | 20.0 | 1.4 | 600 | 45.0 | 8.77 | 8.00 | Reverse | 20 | 1.2 | 398 | 36.2 | 6.37 | 4.38 | Good | Good | Good | Example |
| 15 | Reverse | 16.0 | 1.4 | 547 | 41.8 | 9.29 | 7.16 | Reverse | 20 | 1.2 | 385 | 35.2 | 5.99 | 4.21 | Good | Good | Good | |
| 16 | Reverse | 16.0 | 1.4 | 486 | 32.2 | 6.36 | 7.34 | Reverse | 20 | 1.2 | 402 | 36.2 | 6.44 | 4.46 | Good | Good | Good | |
| 17 | Reverse | 15.0 | 1.4 | 511 | 37.5 | 8.30 | 6.96 | Reverse | 20 | 1.2 | 410 | 38.0 | 6.89 | 4.42 | Good | Good | Good | |
| 18 | Reverse | 15.0 | 1.4 | 472 | 31.6 | 6.46 | 7.05 | Reverse | 20 | 1.2 | 394 | 36.0 | 6.27 | 4.31 | Good | Good | Good | |
| 19 | Reverse | 14.0 | 1.4 | 500 | 37.2 | 8.63 | 6.72 | Reverse | 17 | 1.2 | 352 | 37.9 | 6.94 | 3.27 | Good | Good | Good | |
| 20 | Reverse | 14.0 | 1.4 | 470 | 32.1 | 7.00 | 6.88 | Reverse | 16 | 1.2 | 333 | 34.9 | 6.43 | 3.18 | Good | Good | Good | |
| 21 | Reverse | 12.0 | 1.4 | 459 | 35.6 | 8.85 | 5.92 | Reverse | 19 | 1.2 | 375 | 39.5 | 6.90 | 3.56 | Good | Good | Good | |
| 22 | Reverse | 12.0 | 1.4 | 412 | 27.4 | 6.11 | 6.20 | Reverse | 20 | 1.2 | 400 | 38.6 | 6.83 | 4.15 | Good | Good | Good | |
| 23 | Reverse | 11.0 | 1.4 | 414 | 31.7 | 7.75 | 5.41 | Reverse | 17 | 1.2 | 358 | 37.2 | 6.93 | 3.45 | Good | Good | Good | |
| 24 | Reverse | 11.0 | 1.4 | 384 | 24.1 | 5.47 | 6.12 | Reverse | 16 | 1.2 | 333 | 33.6 | 6.19 | 3.30 | Good | Good | Good | |
| 25 | Reverse | 10.0 | 1.4 | 419 | 26.0 | 7.08 | 6.75 | Reverse | 16 | 1.2 | 342 | 35.0 | 6.62 | 3.34 | Good | Good | Good | |
| 26 | Reverse | 10.0 | 1.4 | 371 | 22.5 | 5.43 | 6.12 | Reverse | 20 | 1.2 | 400 | 38.2 | 6.76 | 4.19 | Good | Good | Good | |
| 27 | Reverse | 10.0 | 1.4 | 410 | 40.0 | 10.66 | 4.20 | Reverse | 19 | 1.2 | 380 | 38.0 | 6.72 | 3.80 | Bad | Good | Bad | Comparative Example |
| 28 | Reverse | 8.0 | 1.4 | 340 | 22.0 | 6.08 | 5.25 | Reverse | 16 | 1.2 | 320 | 32.0 | 5.66 | 3.20 | Good | Good | Good | Example |
| 29 | Reverse | 8.0 | 1.4 | 320 | 18.0 | 4.68 | 5.69 | Reverse | 15 | 1.2 | 300 | 31.0 | 5.48 | 2.90 | Bad | Good | Bad | Comparative Example |
| 30 | Reverse | 22.0 | 1.2 | 450 | 27.0 | 4.89 | 7.50 | Reverse | 22 | 1.0 | 302 | 38.2 | 6.65 | 2.40 | Bad | Good | Bad | |
| 31 | Reverse | 18.0 | 1.2 | 415 | 33.6 | 6.85 | 5.13 | Reverse | 18 | 1.0 | 298 | 38.2 | 6.59 | 2.32 | Good | Good | Good | Example |
| 32 | Reverse | 18.0 | 1.2 | 385 | 27.7 | 5.24 | 5.35 | Reverse | 22 | 1.0 | 285 | 37.0 | 6.11 | 2.20 | Good | Good | Good | |
| 33 | Reverse | 16.0 | 1.2 | 393 | 33.8 | 7.34 | 4.57 | Reverse | 22 | 1.0 | 298 | 38.0 | 6.56 | 2.34 | Good | Good | Good | |
| 34 | Reverse | 16.0 | 1.2 | 356 | 26.2 | 5.16 | 4.84 | Reverse | 22 | 1.0 | 300 | 38.0 | 6.60 | 2.37 | Good | Good | Good | |
| 35 | Reverse | 12.0 | 1.2 | 290 | 35.0 | 7.48 | 2.40 | Reverse | 22 | 1.0 | 298 | 38.2 | 6.59 | 2.32 | Bad | Good | Bad | Comparative Example |
| 36 | Reverse | 12.0 | 1.2 | 290 | 21.0 | 4.49 | 4.00 | Reverse | 22 | 1.0 | 300 | 38.0 | 6.60 | 2.37 | Bad | Good | Bad | |
| 37 | Reverse | 6.0 | 1.2 | 200 | 30.0 | 8.85 | 1.33 | Reverse | 22 | 1.0 | 300 | 37.2 | 6.46 | 2.42 | Bad | Good | Bad | |
| 38 | Reverse | 12.0 | 1.2 | 320 | 38.0 | 8.96 | 2.69 | Reverse | 22 | 1.0 | 289 | 36.9 | 6.17 | 2.26 | Bad | Good | Bad | |
| 39 | Reverse | 13.0 | 1.2 | 340 | 32.0 | 7.40 | 3.61 | Reverse | 22 | 1.0 | 301 | 37.0 | 6.45 | 2.45 | Bad | Good | Bad | |
| 40 | Reverse | 14.0 | 1.2 | 360 | 42.0 | 9.55 | 3.09 | Reverse | 22 | 1.0 | 304 | 38.0 | 6.69 | 2.43 | Bad | Good | Bad | |
| 41 | Reverse | 28.0 | 1.2 | 420 | 43.0 | 5.71 | 4.10 | Reverse | 22 | 1.0 | 299 | 38.0 | 6.58 | 2.35 | Bad | Good | Bad | |

TABLE 2

| | Leading Electrode | | | | | | Trailing Electrode | | | | | | | | | | Evaluation | | | |
|---|---|---|---|---|---|---|---|---|---|---|---|---|---|---|---|---|---|---|---|---|
| No. | Polarity | Wire Feed Speed [m/minute] | Wire Diameter [mm] | Welding Current [A] | Welding Voltage [V] | Expression (1) Calculated Value | Expression (2) Calculated Value | Polarity | Wire Feed Speed [m/minute] | Wire Diameter [mm] | Welding Current [A] | Welding Voltage [V] | Expression (3) Calculated Value | Expression (4) Calculated Value | Spatter Evaluation | Bead Shape | Overall Evaluation | Remarks |
| 42 | Reverse | 7.3 | 2.0 | 594.0 | 32.6 | 8.45 | 10.82 | Reverse | 13 | 1.6 | 477 | 40.0 | 7.30 | 5.69 | Bad | Bad | Bad | Comparative Example |
| 43 | Reverse | 7.3 | 2.0 | 593.0 | 32.3 | 8.36 | 10.89 | Reverse | 13 | 1.6 | 455 | 36.0 | 6.27 | 5.75 | Good | Good | Good | Example |
| 44 | Reverse | 7.3 | 2.0 | 599.0 | 32.8 | 8.57 | 10.94 | Reverse | 13 | 1.6 | 443 | 35.0 | 5.93 | 5.61 | Good | Good | Good | Example |
| 45 | Reverse | 7.3 | 2.0 | 592.0 | 32.5 | 8.40 | 10.77 | Reverse | 13 | 1.6 | 420 | 23.0 | 3.70 | 7.67 | Bad | Bad | Bad | Comparative Example |
| 46 | Reverse | 7.3 | 2.0 | 593.0 | 32.0 | 8.28 | 10.99 | Reverse | 16 | 1.6 | 522 | 44.0 | 7.14 | 6.19 | Bad | Bad | Bad | Comparative Example |
| 47 | Reverse | 7.3 | 2.0 | 591.0 | 32.2 | 8.30 | 10.85 | Reverse | 16 | 1.6 | 510 | 38.0 | 6.03 | 6.84 | Good | Good | Good | Example |
| 48 | Reverse | 7.3 | 2.0 | 599.0 | 32.8 | 8.57 | 10.94 | Reverse | 16 | 1.6 | 496 | 36.0 | 5.55 | 6.83 | Good | Good | Good | Example |
| 49 | Reverse | 7.3 | 2.0 | 592.0 | 32.5 | 8.39 | 10.78 | Reverse | 16 | 1.6 | 470 | 27.0 | 3.95 | 8.18 | Bad | Bad | Bad | Comparative Example |
| 50 | Reverse | 7.3 | 2.0 | 594.0 | 32.6 | 8.45 | 10.82 | Reverse | 16 | 1.6 | 500 | 24.0 | 3.73 | 10.42 | Bad | Bad | Bad | Comparative Example |
| 51 | Reverse | 8.0 | 1.6 | 425.0 | 29.7 | 7.85 | 6.08 | Reverse | 14 | 1.4 | 422 | 39.0 | 7.64 | 4.57 | Bad | Bad | Bad | Comparative Example |
| 52 | Reverse | 8.0 | 1.6 | 430.0 | 29.8 | 7.97 | 6.20 | Reverse | 14 | 1.4 | 413 | 36.0 | 6.90 | 4.80 | Good | Good | Good | Example |
| 53 | Reverse | 8.0 | 1.6 | 433.0 | 30.0 | 8.08 | 6.25 | Reverse | 14 | 1.4 | 404 | 34.0 | 6.38 | 4.80 | Good | Good | Good | Example |
| 54 | Reverse | 8.0 | 1.6 | 429.0 | 30.1 | 8.03 | 6.11 | Reverse | 14 | 1.4 | 366 | 22.0 | 3.74 | 6.09 | Bad | Bad | Bad | Comparative Example |
| 55 | Reverse | 8.0 | 1.6 | 433.0 | 29.2 | 7.86 | 6.42 | Reverse | 18 | 1.4 | 470 | 42.0 | 7.13 | 5.26 | Bad | Bad | Bad | Comparative Example |
| 56 | Reverse | 8.0 | 1.6 | 428.2 | 30.2 | 8.04 | 6.07 | Reverse | 18 | 1.4 | 440 | 36.1 | 5.74 | 5.36 | Good | Good | Good | Example |
| 57 | Reverse | 8.0 | 1.6 | 425.8 | 30.3 | 8.03 | 5.98 | Reverse | 18 | 1.4 | 422 | 33.0 | 5.03 | 5.40 | Good | Good | Good | Example |
| 58 | Reverse | 8.0 | 1.6 | 428.2 | 29.2 | 7.78 | 6.28 | Reverse | 18 | 1.4 | 401 | 27.3 | 3.95 | 5.89 | Bad | Bad | Bad | Comparative Example |
| 59 | Reverse | 10.0 | 1.6 | 505.0 | 34.2 | 8.59 | 7.46 | Reverse | 22 | 1.4 | 530 | 46.0 | 7.20 | 6.11 | Bad | Bad | Bad | Comparative Example |
| 60 | Reverse | 10.0 | 1.6 | 510.2 | 35.0 | 8.89 | 7.44 | Reverse | 22 | 1.4 | 499 | 42.0 | 6.19 | 5.93 | Good | Good | Good | Example |
| 61 | Reverse | 10.0 | 1.6 | 512.2 | 35.4 | 9.02 | 7.41 | Reverse | 22 | 1.4 | 480 | 37.8 | 5.36 | 6.10 | Good | Good | Good | Example |
| 62 | Reverse | 10.0 | 1.6 | 506.2 | 34.2 | 8.61 | 7.49 | Reverse | 22 | 1.4 | 459 | 33.0 | 4.47 | 6.38 | Good | Good | Good | Example |
| 63 | Reverse | 10.0 | 1.6 | 513.0 | 35.2 | 8.99 | 7.48 | Reverse | 22 | 1.4 | 444 | 30.0 | 3.94 | 6.57 | Bad | Bad | Bad | Comparative Example |
| 64 | Reverse | 10.0 | 1.6 | 502.2 | 34.2 | 8.55 | 7.37 | Reverse | 26 | 1.4 | 573 | 49.0 | 7.02 | 6.70 | Bad | Bad | Bad | Comparative Example |
| 65 | Reverse | 10.0 | 1.6 | 504.2 | 34.3 | 8.61 | 7.41 | Reverse | 26 | 1.4 | 512 | 38.9 | 4.98 | 6.74 | Good | Good | Good | Example |
| 66 | Reverse | 10.0 | 1.6 | 511.2 | 35.2 | 8.95 | 7.42 | Reverse | 26 | 1.4 | 498 | 35.0 | 4.36 | 7.09 | Good | Good | Good | Example |
| 67 | Reverse | 10.0 | 1.6 | 514.2 | 36.0 | 9.21 | 7.34 | Reverse | 26 | 1.4 | 480 | 31.0 | 3.72 | 7.43 | Bad | Bad | Bad | Comparative Example |
| 68 | Reverse | 10.0 | 1.6 | 501.2 | 34.9 | 8.70 | 7.20 | Reverse | 30 | 1.4 | 630 | 47.0 | 6.41 | 8.44 | Bad | Good | Bad | Comparative Example |
| 69 | Reverse | 10.0 | 1.6 | 517.2 | 35.2 | 9.06 | 7.37 | Reverse | 30 | 1.4 | 593 | 45.0 | 5.78 | 7.81 | Good | Good | Good | Example |
| 70 | Reverse | 10.0 | 1.6 | 501.2 | 34.2 | 8.53 | 7.35 | Reverse | 30 | 1.4 | 575 | 42.3 | 5.27 | 7.82 | Good | Good | Good | Example |
| 71 | Reverse | 10.0 | 1.6 | 508.2 | 35.2 | 8.90 | 7.34 | Reverse | 30 | 1.4 | 562 | 39.0 | 4.75 | 8.10 | Bad | Good | Bad | Comparative Example |
| 72 | Reverse | 15.0 | 1.4 | 472.0 | 31.6 | 6.46 | 7.05 | Reverse | 22 | 1.2 | 440 | 42.0 | 7.43 | 4.61 | Bad | Bad | Bad | Comparative Example |
| 73 | Reverse | 15.0 | 1.4 | 482.0 | 32.2 | 6.72 | 7.22 | Reverse | 22 | 1.2 | 430 | 39.0 | 6.74 | 4.74 | Good | Good | Good | Example |
| 74 | Reverse | 15.0 | 1.4 | 476.0 | 32.2 | 6.64 | 7.04 | Reverse | 22 | 1.2 | 420 | 38.0 | 6.42 | 4.64 | Good | Good | Good | Example |
| 75 | Reverse | 15.0 | 1.4 | 477.0 | 32.1 | 6.63 | 7.09 | Reverse | 22 | 1.2 | 380 | 25.5 | 3.90 | 5.66 | Bad | Bad | Bad | Comparative Example |
| 76 | Reverse | 15.0 | 1.4 | 479.0 | 32.6 | 6.77 | 7.04 | Reverse | 16 | 1.2 | 350 | 38.0 | 7.35 | 3.22 | Bad | Bad | Bad | Comparative Example |
| 77 | Reverse | 15.0 | 1.4 | 472.1 | 32.8 | 6.71 | 6.80 | Reverse | 16 | 1.2 | 340 | 36.0 | 6.77 | 3.21 | Good | Good | Good | Example |
| 78 | Reverse | 15.0 | 1.4 | 489.2 | 33.0 | 6.99 | 7.25 | Reverse | 16 | 1.2 | 325 | 33.1 | 5.95 | 3.19 | Good | Good | Good | Example |
| 79 | Reverse | 15.0 | 1.4 | 481.1 | 33.1 | 6.90 | 6.99 | Reverse | 16 | 1.2 | 277 | 25.0 | 3.83 | 3.07 | Bad | Bad | Bad | Comparative Example |
| 80 | Reverse | 16.0 | 1.2 | 393.0 | 33.8 | 7.34 | 4.57 | Reverse | 22 | 1.0 | 320 | 42.0 | 7.78 | 2.44 | Bad | Bad | Bad | Comparative Example |
| 81 | Reverse | 16.0 | 1.2 | 393.1 | 33.0 | 7.17 | 4.68 | Reverse | 22 | 1.0 | 300 | 38.1 | 6.62 | 2.36 | Good | Good | Good | Example |
| 82 | Reverse | 16.0 | 1.2 | 400.0 | 33.3 | 7.36 | 4.80 | Reverse | 22 | 1.0 | 253 | 27.0 | 3.96 | 2.37 | Bad | Bad | Bad | Comparative Example |
| 83 | Reverse | 16.0 | 1.2 | 402.3 | 33.5 | 7.45 | 4.83 | Reverse | 20 | 1.0 | 287 | 39.2 | 7.17 | 2.10 | Bad | Bad | Bad | Comparative Example |
| 84 | Reverse | 16.0 | 1.2 | 404.2 | 34.0 | 7.60 | 4.81 | Reverse | 20 | 1.0 | 270 | 36.5 | 6.28 | 2.00 | Good | Good | Good | Example |

TABLE 2-continued

| | Leading Electrode | | | | | | Trailing Electrode | | | | | | | Evaluation | | | |
|---|---|---|---|---|---|---|---|---|---|---|---|---|---|---|---|---|---|
| No. Polarity | Wire Feed Speed [m/minute] | Wire Diameter [mm] | Welding Current [A] | Welding Voltage [V] | Expression (1) Calculated Value | Expression (2) Calculated Value | Polarity | Wire Feed Speed [m/minute] | Wire Diameter [mm] | Welding Current [A] | Welding Voltage [V] | Expression (3) Calculated Value | Expression (4) Calculated Value | Spatter Evaluation | Bead Shape | Overall Evaluation | Remarks |
| 85 Reverse | 16.0 | 1.2 | 409.2 | 34.1 | 7.72 | 4.91 | Reverse | 20 | 1.0 | 243 | 25.0 | 3.87 | 2.36 | Bad | Bad | Bad | Comparative Example |
| 86 Reverse | 10.0 | 1.6 | 511.0 | 34.7 | 8.82 | 7.53 | Reverse | 14 | 1.4 | 413 | 34.0 | 6.52 | 5.02 | Good | Good | Good | Example |
| 87 Reverse | 10.0 | 1.6 | 515.3 | 35.1 | 9.00 | 7.57 | Reverse | 14 | 1.4 | 398 | 30.2 | 5.58 | 5.25 | Good | Good | Good | |
| 88 Reverse | 14.0 | 1.4 | 460.0 | 33.3 | 7.11 | 6.35 | Straight | 22 | 1.2 | 427 | 40.0 | 6.87 | 4.56 | Bad | Bad | Bad | Comparative Example |
| 89 Straight | 14.0 | 1.4 | 471.0 | 37.0 | 8.09 | 6.00 | Reverse | 22 | 1.2 | 422 | 37.7 | 6.40 | 4.72 | Bad | Bad | Bad | |
| 90 Straight | 14.0 | 1.4 | 481.0 | 37.3 | 8.33 | 6.20 | Straight | 22 | 1.2 | 417 | 38.9 | 6.52 | 4.47 | Bad | Bad | Bad | |

Note:
Gas mixture of Ar and 30% $CO_2$ was used for trailing electrode in No. 86, and gas mixture of Ar and 10% $CO_2$ was used for trailing electrode in No. 87.

In the present experiment, as specifically shown in Tables 1 and 2, tandem welding was performed while the wire feed speed of the leading electrode 10 was varied over a range of 4.0 m/minute to 28.0 m/minute, the wire diameter of the leading electrode 10 was varied over a range of 1.2 mm to 2.0 mm, the welding current for the leading electrode 10 was varied over a range of 200 A to 650 A, and the welding voltage for the leading electrode 10 was varied over a range of 16.0 V to 49.0 V. Then, as shown in Tables 1 and 2, the values of Expression (1) and Expression (2) were calculated for each set of welding conditions.

Also in the present experiment, as specifically shown in Tables 1 and 2, tandem welding was performed while the wire feed speed of the trailing electrode 20 was varied over a range of 13 m/minute to 30 m/minute, the wire diameter of the trailing electrode 20 was varied over a range of 1.0 mm to 1.6 mm, the welding current for the trailing electrode 20 was varied over a range of 255 A to 630 A, and the welding voltage for the trailing electrode 20 was varied over a range of 18.0 V to 49.0 V. Then, as shown in Tables 1 and 2, the values of Expression (3) and Expression (4) were calculated for each set of welding conditions.

Also in the present experiment, the amount of spatter produced when welding was performed under each set of welding conditions shown in Tables 1 and 2 was evaluated. As shown in Tables 1 and 2, welding which produced almost no spatter (0.7 g/minute or less) was evaluated as "Good", and welding which produced a large amount of spatter (more than 0.7 g/minute) was evaluated as "Bad". Also in the present experiment, a bead shape obtained after welding was evaluated. A bead formed in a flat shape was evaluated as "Good", and a bead formed in a raised shape was evaluated as "Bad". If both the amount of spatter and the bead shape were evaluated as "Good", an overall evaluation of "Good" was given. If either the amount of spatter or the bead shape was evaluated as "Bad", an overall evaluation of "Bad" was given.

As shown in Tables 1 and 2, in any of Nos. 2, 3, 6 to 11, 14 to 26, 28, 31 to 34, 43, 44, 47, 48, 52, 53, 56, 57, 60 to 62, 65, 66, 69, 70, 73, 74, 77, 78, 81, 84, 86, and 87, the calculated value of Expression (1) was in the range of 5.00 to 10.00 and the calculated value of Expression (2) was 4.50 or more, and the calculated value of Expression (3) was in the range of 4.00 to 7.00 and the calculated value of Expression (4) was 8.00 or less. Therefore, when welding was performed under these welding conditions, an overall evaluation of "Good" was given because of a small amount of spatter and a good bead shape. Note that No. 86 is an example in which a gas mixture of Ar and 30% $CO_2$ was used as the shielding gas $G_2$ for the trailing electrode 20, and that No. 87 is an example in which a gas mixture of Ar and 10% $CO_2$ was used as the shielding gas $G_2$ for the trailing electrode 20.

On the other hand, as shown in Table 1, in No. 1, where the calculated value of Expression (1) exceeded 10.00 and the calculated value of Expression (4) exceeded 8.00, a large amount of spatter was produced and the bead shape was poor. Therefore, as shown in Table 1, the spatter evaluation, the bead shape, and thus the overall evaluation were all "Bad" in No. 1. Also as shown in Table 1, in No. 4, where the calculated value of Expression (1) was less than 5.00, the calculated value of Expression (3) was less than 4.00, and the calculated value of Expression (4) exceeded 8.00, a large amount of spatter was produced and the bead shape was poor. Therefore, as shown in Table 1, the spatter evaluation, the bead shape, and thus the overall evaluation were all "Bad" in No. 4.

Also as shown in Table 1, in No. 13, where the calculated value of Expression (1) exceeded 10.0, a large amount of spatter was produced. Therefore, as shown in Table 1, the spatter evaluation and thus the overall evaluation were "Bad" in No. 13. Also as shown in Table 1, in Nos. 5, 29, and 30, where the calculated value of Expression (1) was less than 5.00, a large amount of spatter was produced. Therefore, as shown in Table 1, the spatter evaluation and thus the overall evaluation were "Bad" in Nos. 5, 29, and 30. Also as shown in Table 1, in Nos. 12 and 27, where the calculated value of Expression (1) exceeded 10.0 and the calculated value of Expression (2) was less than 4.50, a large amount of spatter was produced. Therefore, as shown in Table 1, the spatter evaluation and thus the overall evaluation were "Bad" in Nos. 12 and 27.

Also as shown in Table 1, in Nos. 35 and 37 to 41, where the calculated value of Expression (2) was less than 4.50, a large amount of spatter was produced. Therefore, as shown in Table 1, the spatter evaluation and thus the overall evaluation were "Bad" in Nos. 35 and 37 to 41. Also as shown in Table 1, in No. 36, where the calculated value of Expression (1) was less than 5.00 and the calculated value of Expression (2) was less than 4.50, a large amount of spatter was produced. Therefore, as shown in Table 1, the spatter evaluation and thus the overall evaluation were "Bad" in No. 36. Note in Table 1 that values not satisfying either Expression (1) or Expression (2) are underlined and shown in bold.

As shown in Table 2, in Nos. 42, 46, 51, 55, 59, 64, 72, 76, 80, and 83, where the calculated value of Expression (3) exceeded 7.00, a large amount of spatter was produced and the bead shape was poor. Therefore, as shown in Table 2, the spatter evaluation, the bead shape, and thus the overall evaluation were all "Bad" in Nos. 42, 46, 51, 55, 59, 64, 72, 76, 80, and 83. Also as shown in Table 2, in Nos. 45, 54, 58, 63, 67, 75, 79, 82, and 85, where the calculated value of Expression (3) was less than 4.00, a large amount of spatter was produced and the bead shape was poor. Therefore, as shown in Table 2, the spatter evaluation, the bead shape, and thus the overall evaluation were all "Bad" in Nos. 45, 54, 58, 63, 67, 75, 79, 82, and 85.

Also as shown in Table 2, in Nos. 49 and 50, where the calculated value of Expression (3) was less than 4.00 and the calculated value of Expression (4) exceeded 8.00, a large amount of spatter was produced and the bead shape was poor. Therefore, as shown in Table 2, the spatter evaluation, the bead shape, and thus the overall evaluation were all "Bad" in Nos. 49 and 50. Also as shown in Table 2, in Nos. 68 and 71, where the calculated value of Expression (4) exceeded 8.00, the bead shape was poor. Therefore, as shown in Table 2, the bead shape and thus the overall evaluation were "Bad" in Nos. 68 and 71. Note in Tables 1 and 2 that values not satisfying either Expression (3) or Expression (4) are underlined and shown in bold.

As shown in Table 2, in No. 88, although the trailing electrode 20 satisfied Expression (3) and Expression (4), a large amount of spatter was produced and the bead shape was poor due to the straight polarity of the trailing electrode 20. Therefore, as shown in Table 2, the spatter evaluation, the bead shape, and thus the overall evaluation were all "Bad" in No. 88. Also as shown in Table 2, in No. 89, although the leading electrode 10 satisfied Expression (1) and Expression (2), a large amount of spatter was produced and the bead shape was poor due to the straight polarity of the leading electrode 10. Therefore, as shown in Table 2, the spatter evaluation, the bead shape, and thus the overall evaluation were all "Bad" in No. 89. Also as shown in Table 2, in No. 90, although the leading electrode 10 satisfied Expression (1) and Expression (2) and the trailing electrode 20 satisfied Expression (3) and Expression (4), a large amount of spatter was produced and the bead shape was poor due to the straight polarity of the leading electrode 10 and the trailing electrode 20. Therefore, as shown in Table 2, the spatter evaluation, the bead shape, and thus the overall evaluation were all "Bad" in No. 90.

As a second experiment, tandem welding using a related method not satisfying the requirements of the present invention, and tandem welding using an inventive method satisfying the requirements of the present invention were performed in an equal leg-length flat fillet position. Then, the depth of weld penetration into the base material W and the amount of spatter in the related method were compared with those in the inventive method. In the present experiment, for the related method and the inventive method, tandem welding was performed under the conditions specifically shown in Table 3. Note that the welding conditions for the inventive method shown in Table 3 satisfy Expression (1), Expression (2), Expression (3), and Expression (4) described above. In the present experiment, both the leading electrode 10 and the trailing electrode 20 have a reverse polarity.

TABLE 3

| Welding Position | Flat Fillet Welding | | | |
|---|---|---|---|---|
| Welding Method | Related Method | | Inventive Method | |
| Wire | Leading Electrode | Trailing Electrode | Leading Electrode | Trailing Electrode |
| | Solid Wire φ1.2 | Solid Wire φ1.2 | Solid Wire φ1.6 | Flux-Cored Wire φ1.4 |
| Shielding Gas | Ar—20% $CO_2$ | Ar—20% $CO_2$ | $CO_2$ | Ar—20% $CO_2$ |
| Welding Current [A] | 400 | 398 | 510 | 413 |
| Feed Speed [m/minute] | 20.9 | 18.7 | 12 | 14 |
| Arc Voltage [V] | 37 | 32.3 | 30.2 | 35.7 |
| Wire Extension [mm] | 25 | | 20 | 25 |
| Distance between Leading and Trailing Electrodes [mm] | 20 | | 30 | |
| Welding Speed [cm/minute] | 70 to 110 | | | |
| Weaving Conditions | 3 mm, 3 Hz | | | |

Figure 4:
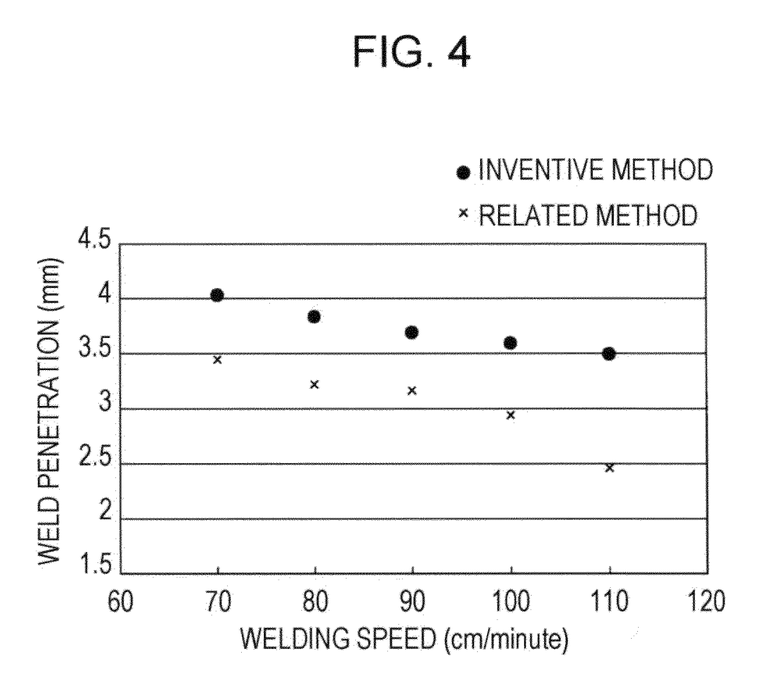
FIG. 4 is a graph showing a depth of weld penetration for each welding speed in tandem gas-shielded arc welding of related art and the present invention.

FIG. 4 is a graph showing the depth of weld penetration for each welding speed in the related method and the inventive method. FIG. 4 shows that when tandem welding was performed with the inventive method, the weld penetration was in the range of 14% (at a welding speed of 70 cm/minute) to 40% (at a welding speed of 110 cm/minute) deeper than that with the related method at any welding speed. With the related method, the welding speed of 70 cm/minute was not sufficient enough to ensure a weld penetration of 3.5 mm. With the inventive method, however, it was possible to ensure a weld penetration of 3.5 mm even when the welding speed was increased to 110 cm/minute, and thus an improved welding efficiency was achieved by the increased depth of weld penetration.

Figure 5A:
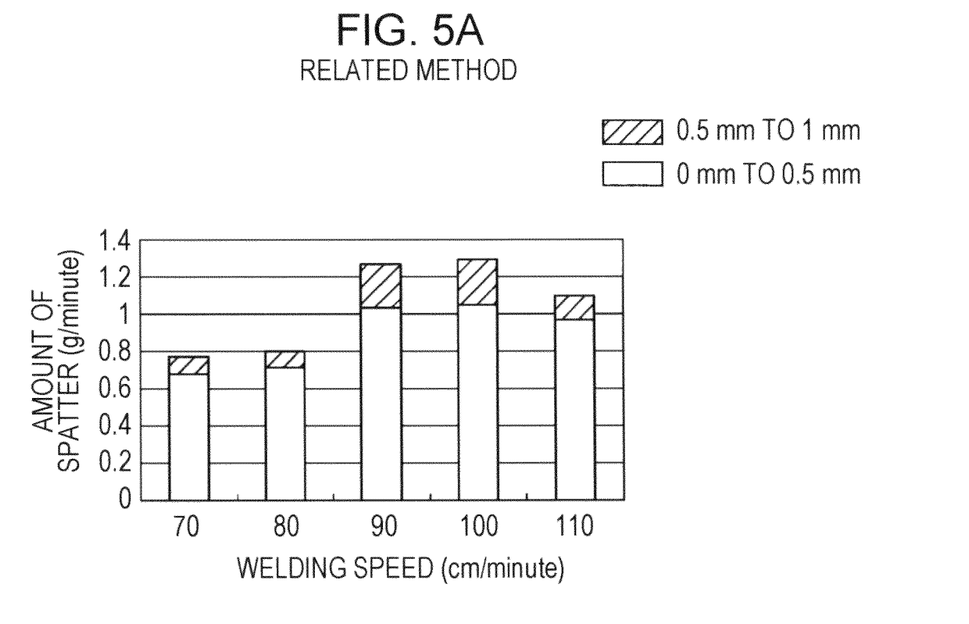
FIG. 5A is a graph showing the amount of spatter for each welding speed in tandem gas-shielded arc welding of related art.
Figure 5B:
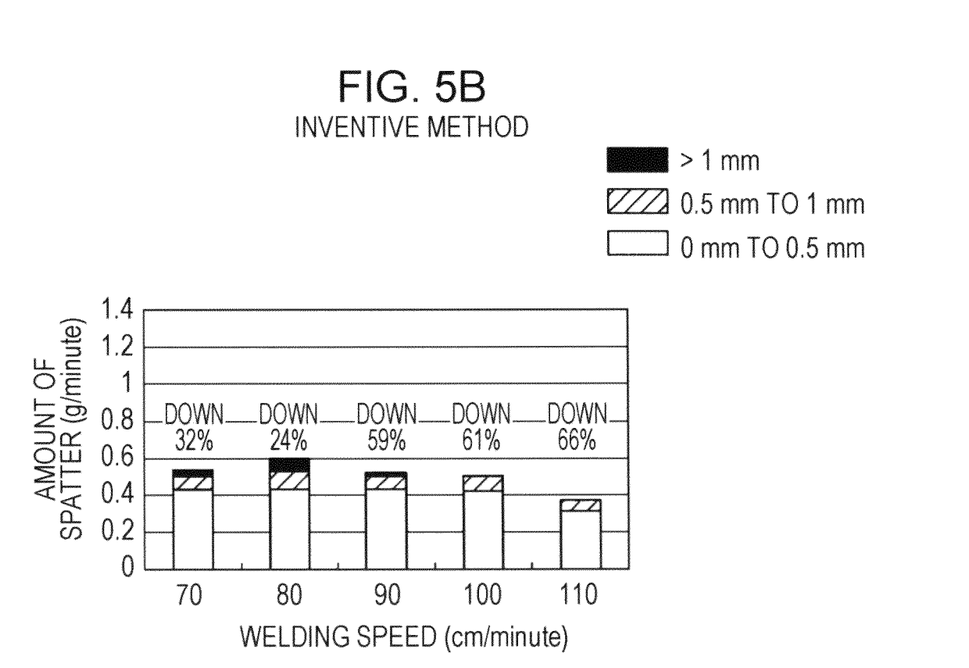
FIG. 5B is a graph showing the amount of spatter for each welding speed in tandem gas-shielded arc welding according to the present invention.

FIG. 5A is a graph showing the amount of spatter for each welding speed in the related method, and FIG. 5B is a graph showing the amount of spatter for each welding speed in the inventive method. In FIG. 5A and FIG. 5B, black, hatched, and white portions of each bar represent the ratios of different levels of spatter. Specifically, two different levels of spatter are indicated by hatched and white portions in FIG. 5A, and three different levels of spatter are indicated by black, hatched, and white portions in FIG. 5B.

FIG. 5A and FIG. 5B show that in tandem welding using the inventive method, the amount of spatter was much smaller than that in tandem welding using the related method. Specifically, as shown in FIG. 5B, the amount of spatter was down 32% at a welding speed of 70 cm/minute, the amount of spatter was down 24% at a welding speed of 80 cm/minute, the amount of spatter was down 59% at a welding speed of 90 cm/minute, the amount of spatter was down 61% at a welding speed of 100 cm/minute, and the amount of spatter was down 66% at a welding speed of 110 cm/minute.

The two experiments described above have shown that even when carbon dioxide is used as the shielding gas $G_1$ for the leading electrode 10, it is possible to reduce the amount of spatter by adjusting the welding conditions for the leading electrode 10 and the trailing electrode 20 to satisfy Expression (1), Expression (2), Expression (3), and Expression (4).

Although the tandem gas-shielded arc welding method according to the present invention has been specifically described with reference to the embodiments and examples above, the scope of the present invention is not to be limited to the above description and is to be broadly interpreted on the basis of the appended claims. It should be understood that various changes and modifications based on the above description are included in the scope of the present invention.

What is claimed is:

1. In a tandem gas-shielded arc welding method which comprises welding with a leading electrode and a trailing electrode while injecting a shielding gas to the weld area, the improvement comprising:
    using a solid wire as the leading electrode and carbon dioxide as a shielding gas for the leading electrode;
    using a solid wire or a flux-cored wire as the trailing electrode and using an argon-carbon dioxide gas mixture containing at least 60% by volume of argon gas as a shielding gas for the trailing electrode;
    making both the leading electrode and the trailing electrode have a reverse polarity;
    adjusting a welding current I (amps), a welding voltage V (volts), a wire feed speed $W_f$ (m/minute), and a wire radius r (m) in welding conditions for the leading electrode to satisfy relationships represented by Expression (1) in (amps·volts)/(m³/minute) and Expression (2) in (amps²/volts); and
    adjusting a welding current I (amps) and a welding voltage V (volts) in the welding conditions for the trailing electrode to satisfy relationships represented by Expression (3) in (amps·volts)/(m³/minute) and Expression (4) in (amps²/volts), $$5.00 \leq \frac{I \cdot V \cdot 10^{-8}}{W_f \cdot \pi r^2} \leq 10.00, \quad \text{Expression (1)}$$

$$\frac{I^2 \cdot 10^{-3}}{V} \geq 4.50, \quad \text{Expression (2)}$$

$$4.00 \leq \frac{I \cdot V \cdot 10^{-8}}{W_f \cdot \pi r^2} \leq 7.00, \text{ and} \quad \text{Expression (3)}$$

$$\frac{I^2 \cdot 10^{-3}}{V} \leq 8.00. \quad \text{Expression (4)}$$

2. The tandem gas-shielded arc welding method according to claim 1, wherein a wire diameter a (mm) of the leading electrode satisfies a≤2.0, and a wire diameter b (mm) of the trailing electrode satisfies b≤(a−0.2).

3. In a tandem gas-shielded arc welding method which comprises welding with a leading electrode and a trailing electrode while injecting a shielding gas to the weld area, the improvement comprising:

employing a solid wire as the leading electrode and 100% carbon dioxide as a shielding gas for the leading electrode;

employing a solid wire or a flux-cored wire as the trailing electrode and an argon-carbon dioxide gas mixture containing at least 60% by volume of argon gas as a shielding gas for the trailing electrode;

imparting a reverse polarity to both the leading electrode and the trailing electrode;

adjusting a welding current I (amps), a welding voltage V (volts), a wire feed speed $W_f$ (m/minute), and a wire radius r (m) in the welding conditions for the leading electrode to satisfy the relationships represented by Expression (1) in (amps·volts)/(m³/minute) and Expression (2) in (amps²/volts); and adjusting a welding current I (amps) and a welding voltage V (volts) in the welding conditions for the trailing electrode to satisfy the relationships represented by Expression (3) in (amps·volts)/(m³/minute) and Expression (4) in (amps²/volts), $$5.00 \leq \frac{I \cdot V \cdot 10^{-8}}{W_f \cdot \pi r^2} \leq 10.00, \qquad \text{Expression (1)}$$

$$\frac{I^2 \cdot 10^{-3}}{V} \geq 4.50, \qquad \text{Expression (2)}$$

$$4.00 \leq \frac{I \cdot V \cdot 10^{-8}}{W_f \cdot \pi r^2} \leq 7.00, \text{ and} \qquad \text{Expression (3)}$$

$$\frac{I^2 \cdot 10^{-3}}{V} \leq 8.00. \qquad \text{Expression (4)}$$

4. The tandem gas-shielded arc welding method according to claim 3, wherein a wire diameter a (mm) of the leading electrode satisfies a≤2.0, and a wire diameter b (mm) of the trailing electrode satisfies b≤(a−0.2).

* * * * *